United States Patent [19]
Bredberg et al.

[11] Patent Number: 6,154,534
[45] Date of Patent: Nov. 28, 2000

[54] FLEXIBLE ROUTING OF LOCAL NUMBER PORTABILITY (LNP) DATA IN A TELECOMMUNICATIONS NETWORK

[75] Inventors: Tony Bredberg, Richardson; Martina Hughes, Dallas, both of Tex.

[73] Assignee: Ericsson, Inc., Richardson, Tex.

[21] Appl. No.: 09/001,332

[22] Filed: Dec. 30, 1997

[51] Int. Cl.[7] .................................................. H04M 7/00
[52] U.S. Cl. ........................ 379/207; 379/201; 379/219; 379/220; 379/21
[58] Field of Search ...................................... 379/201, 207, 379/219, 220, 221, 229, 230, 211, 210; 707/204

[56] References Cited

U.S. PATENT DOCUMENTS

| | | | |
|---|---|---|---|
| 5,509,058 | 4/1996 | Sestak et al. | 379/201 |
| 5,546,574 | 8/1996 | Grosskopf et al. | 379/201 |
| 5,553,130 | 9/1996 | Turner | 379/207 |
| 5,661,792 | 8/1997 | Akinpelu et al. | 379/207 |
| 5,717,748 | 2/1998 | Sneed, Jr. et al. | 379/219 |
| 5,717,749 | 2/1998 | Sneed, Jr. et al. | 379/207 |
| 5,740,239 | 4/1998 | Bhagat et al. | 379/201 |
| 5,778,387 | 7/1999 | Wilkerson et al. | 707/204 |
| 5,883,950 | 3/1999 | Sonnenberg | 379/207 |
| 5,910,981 | 6/1999 | Bhagat et al. | 379/207 |
| 5,933,489 | 8/1999 | Sensabaugh et al. | 379/219 |
| 5,937,343 | 8/1999 | Leung | 379/201 |
| 5,966,730 | 8/1999 | Zulch | 707/204 |
| 6,009,430 | 12/1999 | Joseph et al. | 707/204 |

*Primary Examiner*—Krista Zele
*Assistant Examiner*—William J. Deane, Jr.
*Attorney, Agent, or Firm*—Arthur I. Navarro

[57] ABSTRACT

A system and method for deploying Local Number Portability (LNP) data including ported telephone numbers in a telecommunications network having a Number Portability Administration Center (NPAC) which stores a national database of LNP data. The system includes a plurality of primary network elements which store assigned subsets of the national LNP database, and a backup network element which backs up the plurality of primary network elements and stores the national LNP database. The system also includes a Local Service Management System (LSMS) which interfaces with the NPAC and transmits the national LNP database to the backup network element, divides the national LNP database into the subsets, and transmits the subsets to the plurality of network elements. The LSMS determines whether the LNP data includes a range of sequential telephone numbers, and if so, routes in a single message the range of sequential telephone numbers from the LSMS to the primary network element to which the range is assigned. The LSMS also routes the range of sequential telephone numbers from the LSMS to the backup network element in a single message.

2 Claims, 7 Drawing Sheets

FLEXIBLE ROUTING OF LOCAL NUMBER PORTABILITY (LNP) DATA IN A TELECOMMUNICATIONS NETWORK

BACKGROUND OF THE INVENTION

1. Technical Field of the Invention

This invention relates to telecommunication systems and, more particularly, to a system and method of routing local number portability (LNP) data in a telecommunications network.

2. Description of Related Art

The term Local Number Portability (LNP) is utilized in connection with several types of subscriber service changes in which a subscriber may keep his original telephone number. For example, LNP may refer to location portability which involves the capability to physically move (port) a subscriber's line connection from one switch to another within a rate center while retaining the subscriber's original telephone number. LNP may also refer to service provider portability which involves changing a subscriber's service from one service provider to another while retaining the subscribers original telephone number. Or LNP may refer to service type portability which involves changing the type of service (for example from POTS to ISDN) while retaining the subscriber's original telephone number. The present invention relates to location portability within a rate center and service provider portability.

FIG. 1 is a simplified block diagram of an existing LNP network configuration. All information about all ported numbers is loaded from a central database system in which several Number Portability Administration Centers (NPACs) 11 are distributed throughout the country. In each area, the LNP data is downloaded from the NPAC 11 to a Local Service Management System (LSMS) 12 in order to populate network elements 13–15 deployed in the LNP network with the ported subscriber data. Each service provider may implement its own LSMS, and each LSMS is notified by the NPAC which numbers are ported. In this way, callers in different networks continue to dial the subscriber's original number, and each network is aware of the fact that the dialed number has been ported, and routes the call accordingly.

The LSMSs communicate with the NPAC over a Common Management Interface Service Element (CMISE) interface 16, over which ported numbers are downloaded to the LSMSs one at a time. The network elements 13–15 may comprise service control points (SCPs) and/or service transfer points (STPs). In the standard configuration, each SCP and STP node is typically populated with the entire national LNP database of ported numbers. To ensure high availability in the network, the nodes are typically deployed as mated pairs with a primary and a backup element for each node. Then, in the switching network, the Service Switching Points (SSPs) may be programmed to interrogate specified SCPs when they need to access the LNP database.

Each ported number is identified by its Numbering Plan Area Office Code (NPA-NXX) where the NPA relates to the area code, and the NXX relates to the exchange code. For example, in the telephone number 214-997-1234, the NPA is 214 and the NXX is 997.

The ported subscriber data downloaded from the NPAC 11 and LSMS 12 for a single subscriber is grouped into a single record called an LNP subscription. The information contained within the LNP subscription is the routing data necessary to route a call to the subscriber's new location or new service provider's switch. The information is categorized as Location Routing Number (LRN) data and Global Title Translation (GTT) data. GTT data is necessary for the routing of services such as Line Information Database service (LIDB), Custom Local Area Signaling Services (CLASS), Caller ID With Name (CNAM), and Interswitch Voice Messaging (ISVM). Upon reception of this information from the NPAC 11, the LSMS 12 populates the LRN and GTT functions deployed in the network elements 13–15 with the relevant data elements.

FIG. 2 is an illustrative drawing illustrating the steps involved when retrieving a Location Routing Number (LRN) in an existing telecommunications network having LNP service provisioning. At 21, a calling subscriber dials the telephone number of a called subscriber 26, for example 214-997-1234. The call is routed to an originating switch 22. There are triggers set up within the originating switch to recognize that the NPA-NXX (214-997) has been ported. Therefore, a lookup is performed in the LNP database 23 of a SCP associated with the originating switch to retrieve a LRN corresponding to the dialed telephone number. If the LNP database indicates that the dialed number is not ported, then the dialed number is returned to the originating switch. The originating switch then routes the call on the LRN at 24 to a destination switch 25 which handles the NXX in the retrieved number (e.g., 881). The dialed telephone number is saved in a GAP indicator. The destination switch replaces the LRN with the dialed telephone number since the called subscriber 26 is still using the dialed telephone number. The call completely bypasses the 997 NXX switch 27.

The existing LNP network configuration, the existing method of populating the network elements with LNP data, and the existing method of retrieving a LRN suffer from several disadvantages. First, the existing configuration is very expensive due to the implementation of mated pairs of SCPs or STPs for every network element node. The quantity of ported numbers is growing rapidly, and their storage requires ever increasing amount of memory. It would be advantageous to have a method of populating the nodes that did not require that the entire national LNP database be loaded into each node. A more cost-effective network configuration could then be implemented.

In addition, the existing method of populating the LSMSs with LNP data by the NPAC, and the subsequent population of the network element nodes is extremely inefficient. The ported numbers are transported one at a time. This limitation becomes even more pronounced when audits are performed between a LSMS and the network nodes which it populates. When thousands or millions of numbers are involved, the signaling load becomes very burdensome. It would be advantageous to have a more efficient method for the LSMS to populate the network elements.

There are no known prior art teachings of a solution to the aforementioned deficiency and shortcoming such as that disclosed herein.

SUMMARY OF THE INVENTION

In one aspect, the present invention is a system for deploying Local Number Portability (LNP) data including ported telephone numbers from a Number Portability Administration Center (NPAC) which stores a national database of LNP data to a plurality of LNP network elements in a telecommunications network. The system comprises a plurality of primary LNP network elements which store assigned subsets of the national LNP database, a backup LNP network element which backs up the plurality of primary LNP network elements and stores the national LNP database, and a Local Service Management System (LSMS) interfaced with the NPAC. The LSMS includes means for assigning the subsets of the national LNP database to each of the plurality of primary LNP network elements, and means for transmitting the national LNP database to the backup LNP network element and for transmitting the assigned subsets of the national LNP database to the plurality of primary LNP network elements.

In another aspect, the present invention is a method of deploying Local Number Portability (LNP) data including ported telephone numbers from a Local Service Management System (LSMS) to a plurality of LNP network elements in a telecommunications network. The method comprises the steps of assigning each of the plurality of LNP network elements to store an associated range of sequential telephone numbers, and routing, from the LSMS to each assigned LNP network element, the range of sequential telephone numbers associated with each LNP network element. The associated range of numbers is included in a single message to each assigned LNP network element.

In another aspect, the present invention is a method of auditing Local Number Portability (LNP) data including ported telephone numbers deployed from a Local Service Management System (LSMS) to one or more primary LNP network elements and a backup LNP network element in a telecommunications network. The LSMS includes a Number Manager with a LNP database and a Service Management Application System (SMAS). The method begins by sending an audit request from the Number Manager to the SMAS, the audit request including the LNP data to be audited in the LNP primary network element and the backup LNP network element. The SMAS then transmits a first retrieval message to the primary LNP network element, the first retrieval message including a range of sequential telephone numbers in a single message, and requesting the primary LNP network element to retrieve and report the LNP data associated with each telephone number in the range. The SMAS also transmits a second retrieval message to the backup LNP network element, the second retrieval message including the range of sequential telephone numbers in a single message, and requesting the backup LNP network element to retrieve and report the LNP data associated with each telephone number in the range. The primary LNP network element and the backup LNP network element then report to the SMAS, the LNP data associated with each telephone number in the range. This is followed by determining in the SMAS whether the LNP data reported by the primary LNP network element is consistent with the LNP data reported by the backup LNP network element, and reporting an inconsistency to a network operator, upon determining that the LNP data reported by the primary LNP network element and the backup LNP network element are inconsistent.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
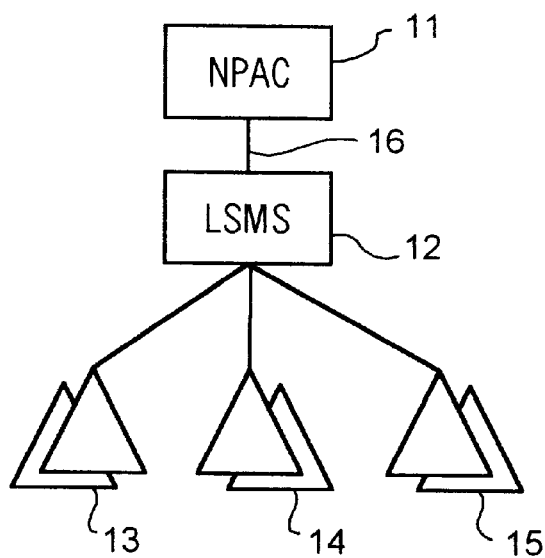
FIG. 1 (Prior Art) is a simplified block diagram of an existing LNP network configuration.
Figure 3:
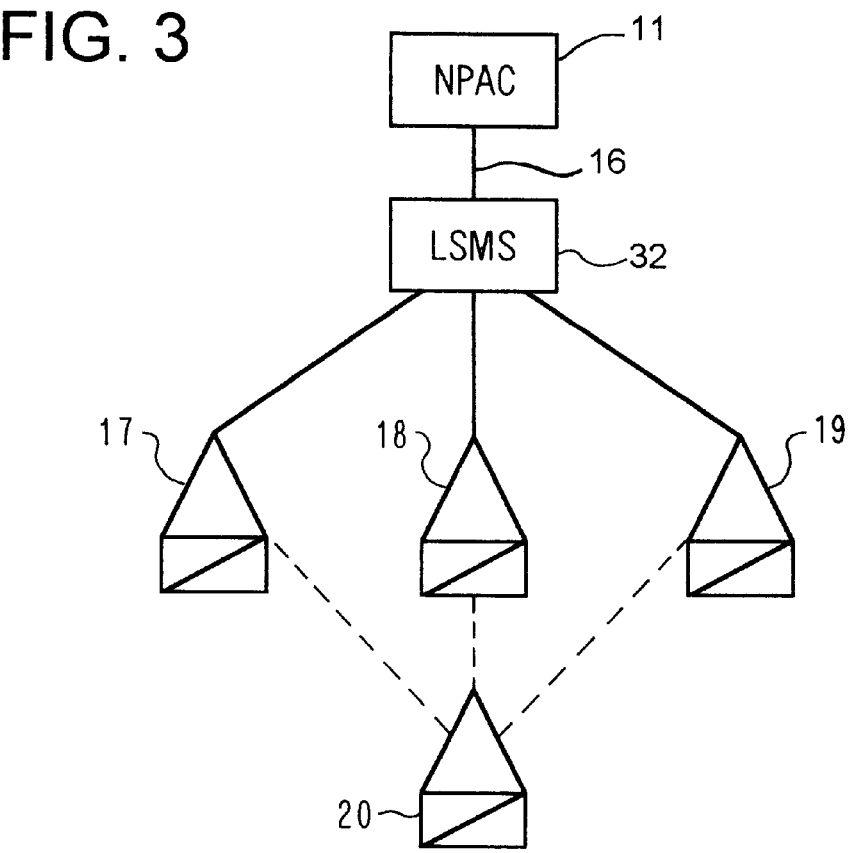
FIG. 3 is a simplified block diagram of the Local Number Portability (LNP) network configuration of the preferred embodiment of the present invention.
Figure 2:
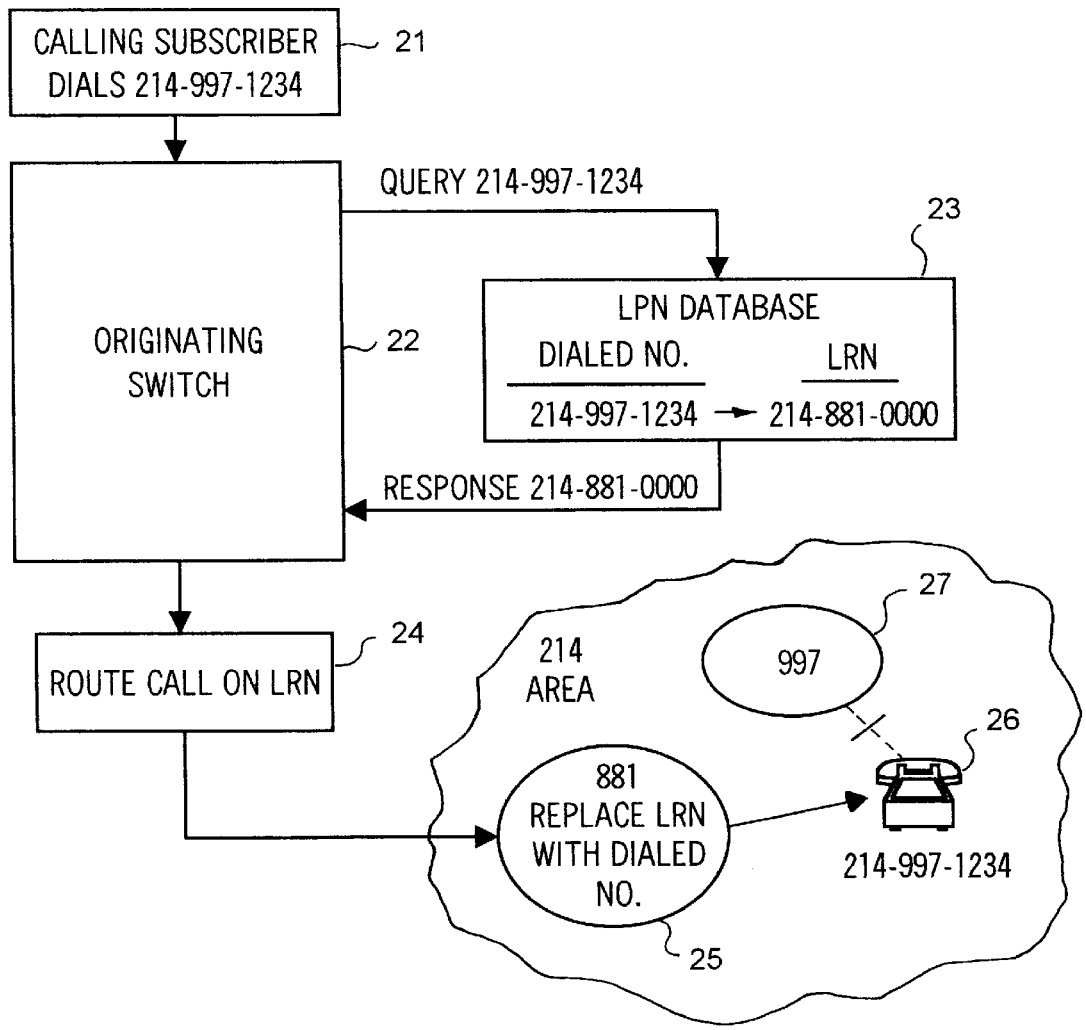
FIG. 2 (Prior Art) is an illustrative drawing illustrating the steps involved when retrieving a Location Routing Number (LRN) in an existing telecommunications network having LNP service provisioning.

FIG. 3 is a simplified block diagram of the Local Number Portability (LNP) network configuration of the preferred embodiment of the present invention. The NPAC 11 interfaces with a modified LSMS 32 of the present invention through the CMISE interface 16. The LNP data may also be divided on the basis of the NPA-NXX, and be distributed to several LSMSs. Each LSMS 32 then interfaces with several LNP network elements 12–20. The LNP network elements may be SCPs and/or LNP relay nodes. A LNP relay node is part of a STP that performs 10-digit Global Title Translations (GTT) for local number portability. The SCPs and the LNP relay nodes may be implemented separately or may be combined in a single LNP network element. GTT data is then sent to the LNP relay nodes, and Location Routing Number (LRN) data is sent to the SCPs.

In the present invention, dedicated LNP network elements are deployed to serve specific ranges of telephone numbers rather than loading the entire national LNP database of ported numbers, which may number in the millions of subscribers, into every node. The amounts of data stored in each LNP network element may vary widely, providing a very flexible network configuration. A single backup LNP network element 20 is then implemented and loaded with the entire national LNP database so that the LNP network element 20 may function as a backup to any of the primary LNP network elements 17–19. The invention, of course, is not limited to any one configuration of LNP network elements. For example, some of the LNP network elements with extremely heavy traffic loads may be implemented as mated pairs while a plurality of other LNP network elements rely on a single backup LNP network element.

Figure 4:
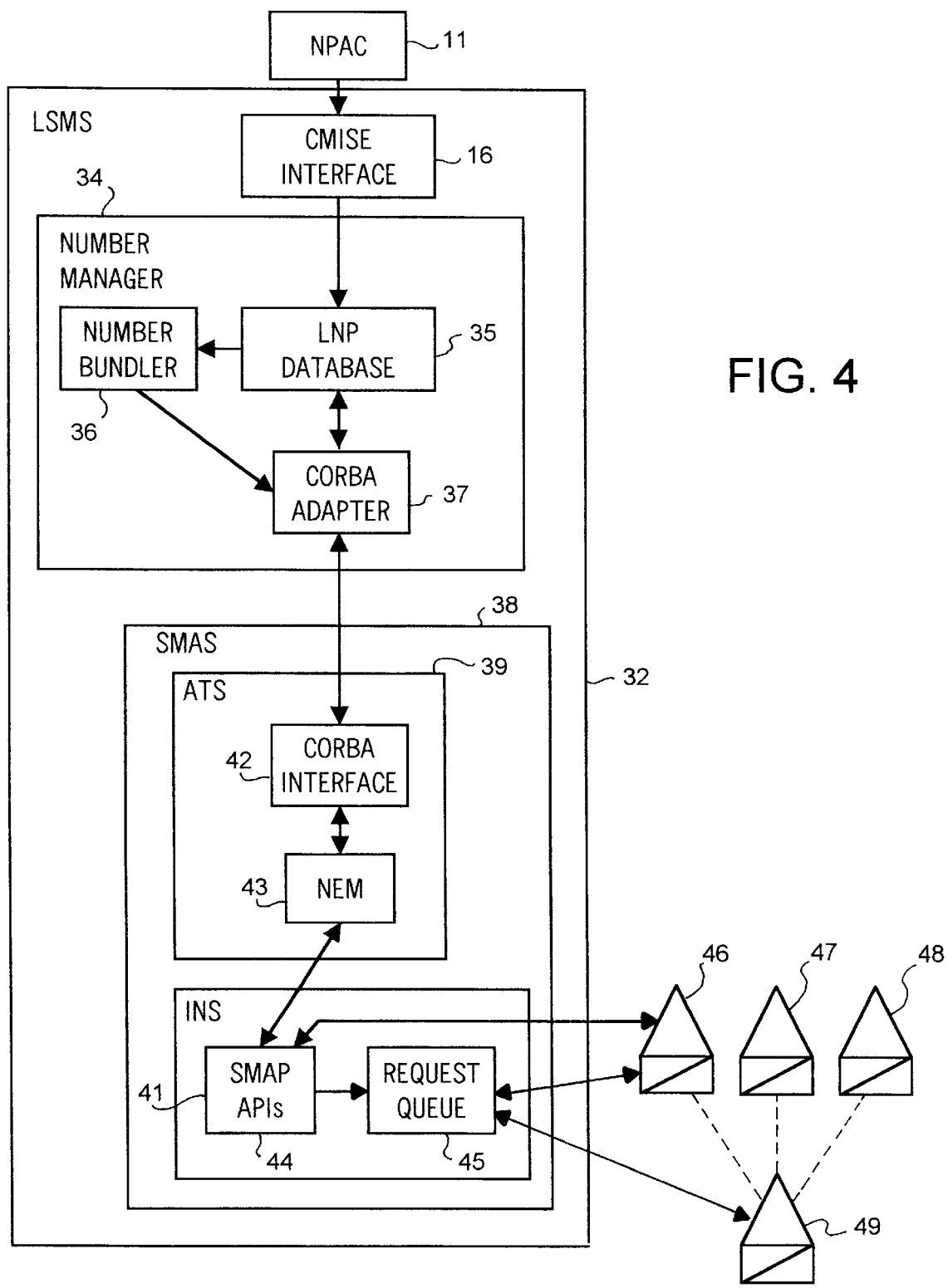
FIG. 4 is a simplified block diagram of the modified LSMS of FIG. 3.

FIG. 4 is a simplified block diagram of the modified LSMS 32 of FIG. 3. As noted above, the LNP data passes from the NPAC 11 to the modified LSMS 32 through the CMISE interface 16. The LNP data then passes through a Number Manager 34. The Number Manager includes a LNP database 35, a Number Bundler 36, and a Common Object Request Broker Architecture (CORBA) Adapter 37. Ported numbers come from the NPAC, over the CMISE interface to the Number Manager where they are placed in the LNP database. If a plurality of sequential numbers are received in the Number Manager, they are sent to the Number Bundler 36 and are then forwarded as a block via the CORBA Adapter to a Service Management Application System (SMAS) 38. The Number Manager 34 may connect to a plurality of SMAS systems, and divide the ported number information based on the NPA-NXX. In the preferred embodiment, only a single SMAS system is utilized.

The SMAS 38 creates intelligent network services out of service scripts and then passes them down to SCPs. The SMAS includes an AIN Turnkey Services (ATS) function block 39 and an Intelligent Network Subsystem (INS) function block 41. The ATS function block includes a CORBA interface and a Network Element Manager (NEM) 43. The INS function block includes a function block for SMAP Application Instructions (SMAP APIs) 44 and a request queue 45. Subscriber data is not stored in the SMAS. It is stored in the Number Manager database, so there is no capacity limitation introduced by the SMAS.

The SMAS interfaces with a plurality of LNP network elements 46–48 through the request queue 45 based on NPA-NXXs. The routing may be set up to route all NPAs to one LNP network element, or a range operation may be utilized to route a specified range of NPA-NXXs to each LNP network element. For example, West Coast NPA-NXXs may go to LNP network element 46, Central NPA-NXXs to LNP network element 47, and East Coast NPA-NXXs to LNP network element 48. In the present invention, the LNP network elements are deployed singly, and a single backup LNP network element 49 is loaded with all ported number data, and can be brought on line if one of the primary LNP network elements 46–48 fails. In the switching network, the Service Switching Points (SSPs) (not shown) may be programmed to interrogate the specified LNP network element having LRN information for the NPA-NXX falling within that LNP network element's range. If that primary LNP network element fails, then the SSP accesses the single backup LNP network element 49 which is populated with all LNP data.

The present invention supports the sending of blocks or ranges of numbers rather than recording or auditing one number at a time. The invention supports 1,000 ports per second or 2,000 GTT translations per second. When ported numbers come down from the NPAC 11, they are in numerical order, but they are not in one message. The Number Bundler 36 in the Number Manager 34 compiles them into a range of numbers which is then sent to the SMAS 38 in a single message. Up to 1,000 numbers may be carried by a single message. For example, 214-997-1000 through 214-997-1999 may be carried in a single message to the SMAS. The range of numbers is forwarded by the SMAS as a single operation to the LNP network element storing that range of NPA-NXXs. This provides an extremely fast interface between the SMAS and the LNP network element, much faster than any known interface between LSMSs and LNP network elements.

From time to time, the NPAC 11 sends audit requests to verify that the LSMS data is consistent with the NPAC data. The LSMS master database in the present invention is maintained as the LNP database 35 in the Number Manager 34. There is no database in the SMAS 38. In response to an audit request from the NPAC, The LSMS compares the NPAC data with the LNP database 35.

Periodically, the LSMS 32 initiates its own audit of the data stored in the LNP network elements 46–49 which the LSMS populates. LNP data to be verified is distributed to the LNP network elements according to each LNP network elements assigned NPA-NXX range. For example, an audit may be conducted to verify that the data is consistent for the number 214-997-1234. The number 214-997-1234 is sent down from the Number Manager 34 to the SMAS 38 with a request to retrieve the corresponding data. The SMAS 38 retrieves the data from the LNP network element having 214-997 within its NPA-NXX range, and from the backup LNP network element 49 which includes all LPN data. If the data retrieved from the two LNP network elements are consistent, the data are reported to the Number Manager. The Number Manager then compares the reported data with the data in the LNP database. If the data do not match, the data is re-deployed to the LNP network elements. If the data retrieved from the two LNP network elements are not consistent, the SMAS does not know which LNP network element is correct. Therefore, an "inconsistency" indication is sent to the Number Manager. The data is then be re-deployed, and the data is overwritten in the primary and backup LNP network elements with the new data.

The present invention also handles ranges of numbers when performing audits. A single message carries the range of numbers down from the Number Manager 34 to the SMAS 38. The SMAS sends a single request to the LNP network elements to retrieve the data on all the numbers in the requested range. The LNP network elements report the numbers within the range as being present, missing, or a discrepancy. The reports may show, for example, that the numbers 1000–1050 have the same LRN in each of the audited LNP network elements (i.e., are consistent), but 1051 has a different LRN in different LNP network elements (i.e., not consistent). Then 1052 through 1120 are consistent in each LNP network element, but 1121 is not consistent. Then 1122 through 1999 are consistent in each LNP network element. The SMAS 38 does a comparison on the results and sends messages back to the Number Manager 34 reporting the results of the comparison. In this example, 5 messages are sent. The first block of numbers (1000–1050) is reported as a "read-found" in one message since they are all consistent. Then 1051 is reported as "inconsistent" in a second message. The block 1052–1200 is reported as a "read-found" in a third message since they are all consistent. Then 1201 is reported as an "inconsistent" in a fourth message. Finally, the block 1202–1999 is reported as a "read-found" in a fifth message since they are all consistent. If data is missing in the number series, the report is "read-not found". For example, if an LNP network element was populated with LRN data up to 214-997-1900, and the audit requests that a range up to 1999 be checked, then the report message will include a "read-not found" for the range from 1901–1999.

The present invention utilizes an add/replace operation instead of the add/change operation utilized by existing solutions. The benefit is readily apparent when a plurality of network elements all contain the same LNP data, and a new number is deployed. The existing LSMSs perform a create function in the LNP network elements. However, if a number already exists in one of the LNP network elements (for example, if added manually), the create function does not succeed; it returns an error indication. Therefore in existing LSMSs, separate messages must be generated to delete the number and then add the number. In the present invention, if a number is not already there, it is added; if the number is already there, it is simply overwritten. This simplifies the interface between the LNP network elements and the LSMS.

Figure 5:
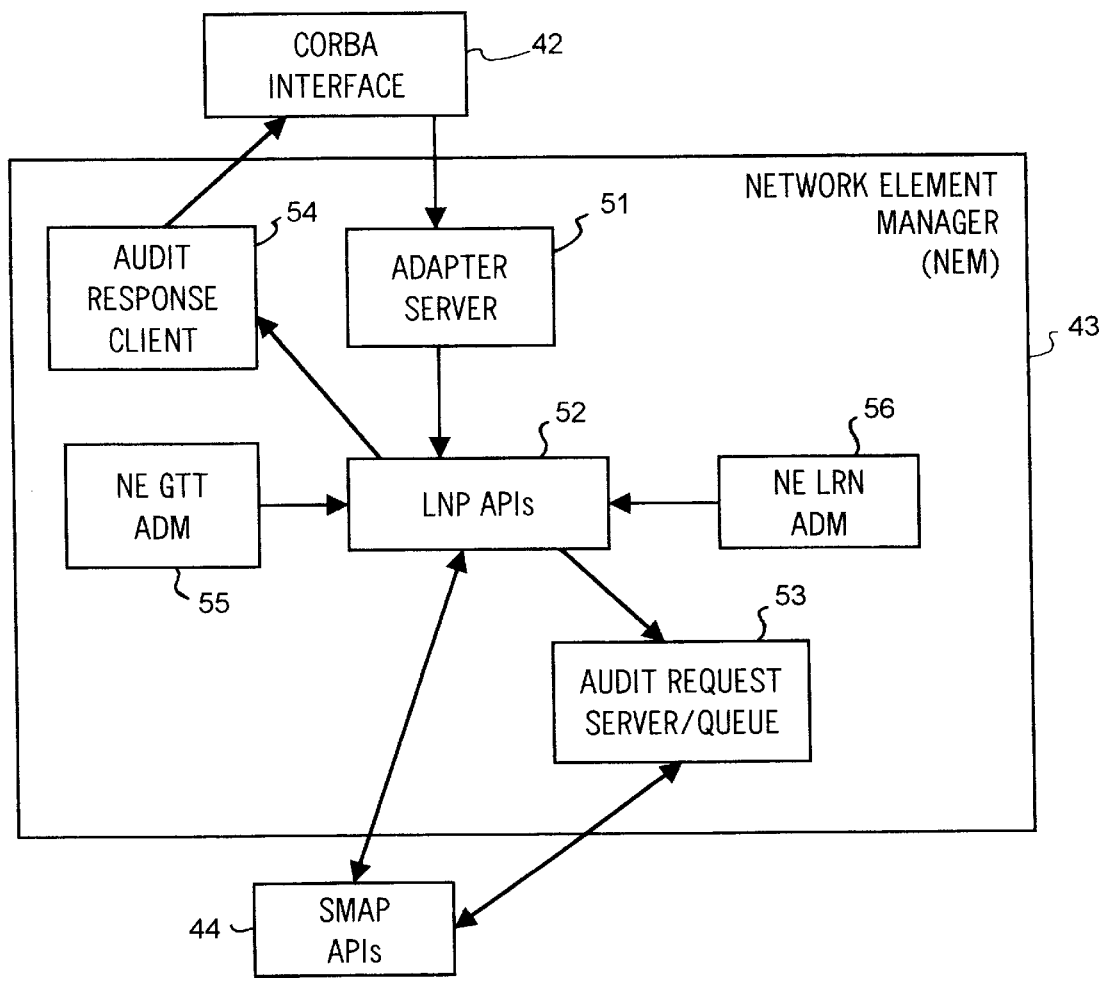
FIG. 5 is a simplified block diagram of the Network Element Manager (NEM) of FIG. 4.

FIG. 5 is a simplified block diagram of the Network Element Manager (NEM) 43 of FIG. 4. Requests to add/delete/retrieve numbers and audit requests come down from the Number Manager 34 through the CORBA interface 42. The requests enter the NEM 43 through an Adapter Server 51 and are passed to a LNP Application Instruction block (LNP APIs) 52. If the request is a add/delete/retrieve instruction, it is passed directly to the SMAP APIs 44 in the SMAS 38 (FIG. 4). If the request is an audit instruction, it is passed to an audit request server/queue 53 and then to the SMAP APIs 44. Audit responses are routed through an audit response client 54 and the CORBA interface 42 back to the Number Manager 34. The NEM also includes a Network Element GTT data Administrator (NE GTT Adm) 55 and a Network Element LRN data Administrator (NE LRN Adm) 56.

Any request from the Number Manager 34 comes down as a range. The Number Manager assembles the ranges and sends them down. The request is divided up into a request to look at data from a LNP network element and another request to look at data from a STP. The requests are stored in the audit request server/queue 53, and the system handles them as rapidly as possible. The SMAS fetches the data, makes comparisons, and sends the results back in as few messages as possible by sending blocks of similar results. The SMAS assembles similar results into ranges by looking at the next number in the range, determining whether the data is the same as the last number (for example, both numbers were reported present), and if so, including it in the range. If the data is not the same (for example, the current number is missing and the last number was present), a new range is started.

Figure 6:
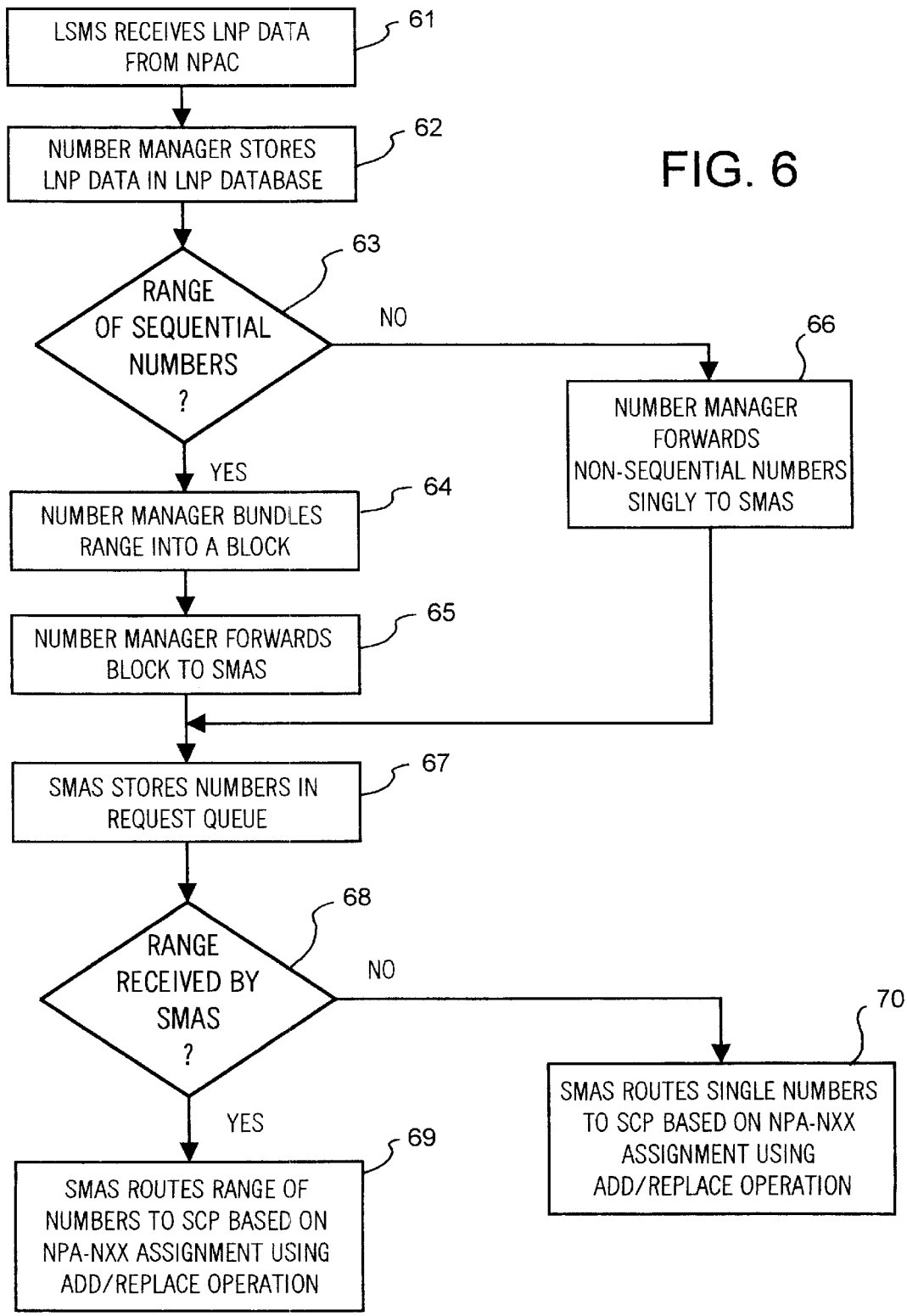
FIG. 6 is a flow chart of the steps of the method of the present invention when deploying LNP number data to LNP network elements such as the SCPs of FIG. 3.

FIG. 6 is a flow chart of the steps of the method of the present invention when deploying ported LNP number data to LNP network elements such as LNP network elements 17–20 of FIG. 3. At step 61, the LSMS 32 receives LNP data for numbers in numerical order from the NPAC 11. At 62, the Number Manager 34 stores the LNP data in the LNP database 35. At step 63, it is determined whether or not the LNP data includes data on a range of sequential numbers. If yes, the Number Manager bundles the range of sequential numbers into a block at step 64 with the number bundler 36. The block is then forwarded to the SMAS 38 at step 65. If, however, there is not a range of sequential numbers at 63, the method moves to step 66 where the Number Manager forwards the non-sequential numbers singly to the SMAS.

At step 67, the SMAS stores the received numbers in the request queue 45. At step 68, the SMAS determines whether a bundled range of numbers was received. Each bundled range of numbers falls within a single NPA-NXX designation, but the bundled range may span several LNP network elements. The bundled range of numbers may fall within the range of numbers stored within a single LNP network element, or may span several LNP network elements. Therefore, if a range was received, the SMAS determines at step 69 which portion of the bundled range is assigned to each LNP network element and routes the range of numbers appropriately to the assigned LNP network element(s) in a single message utilizing an add/replace operation. If a single number is received rather than a range of numbers, the method moves from step 68 to step 70 where the SMAS routes the single number to the appropriate LNP network element based on the NPA-NXX assignment utilizing an add/replace operation.

Figure 7A:
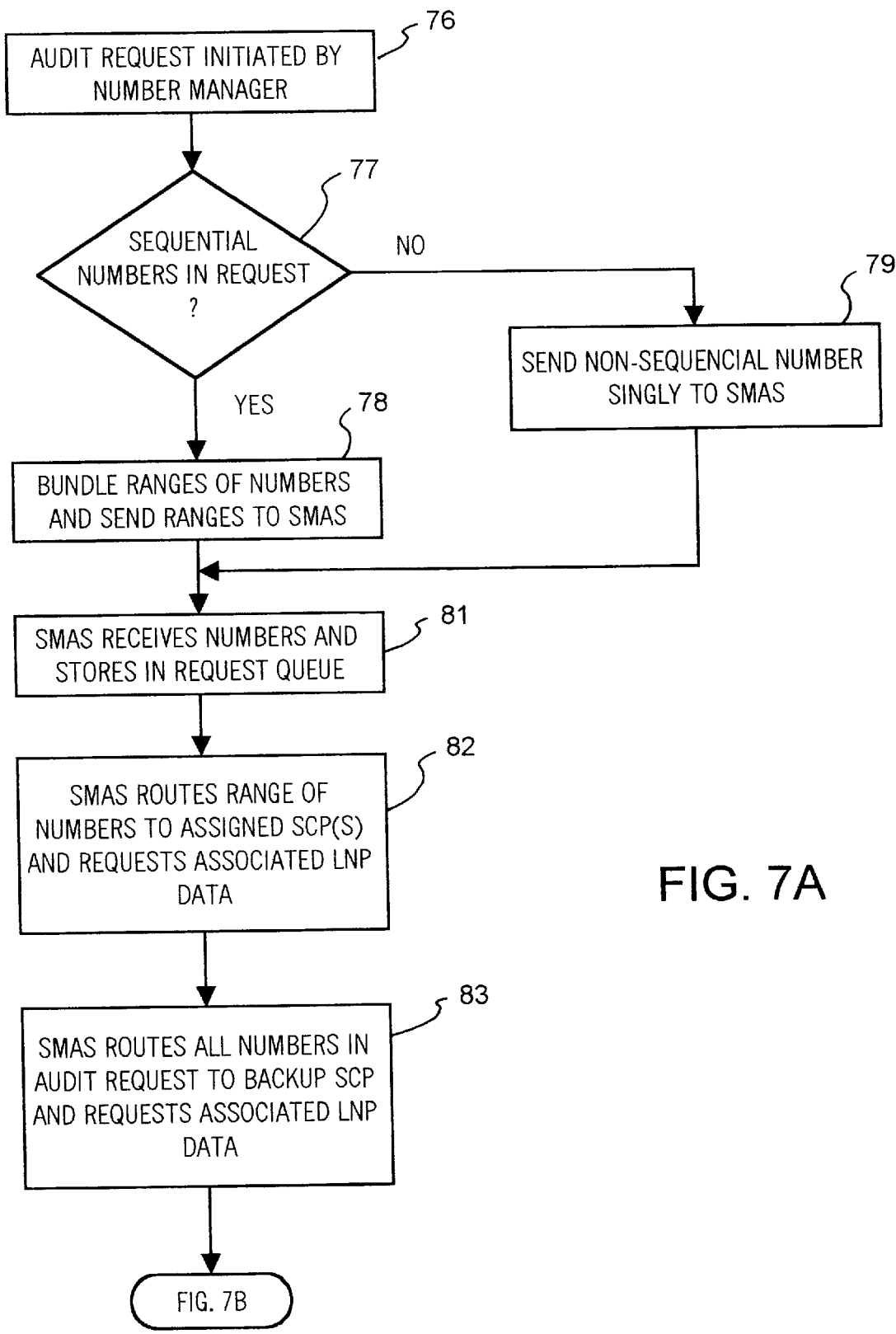
FIGS. 7A and 7B are a flow chart of the steps of the method of the present invention when the LSMS performs an audit of ported LNP number data in the LNP network elements.
Figure 7B:
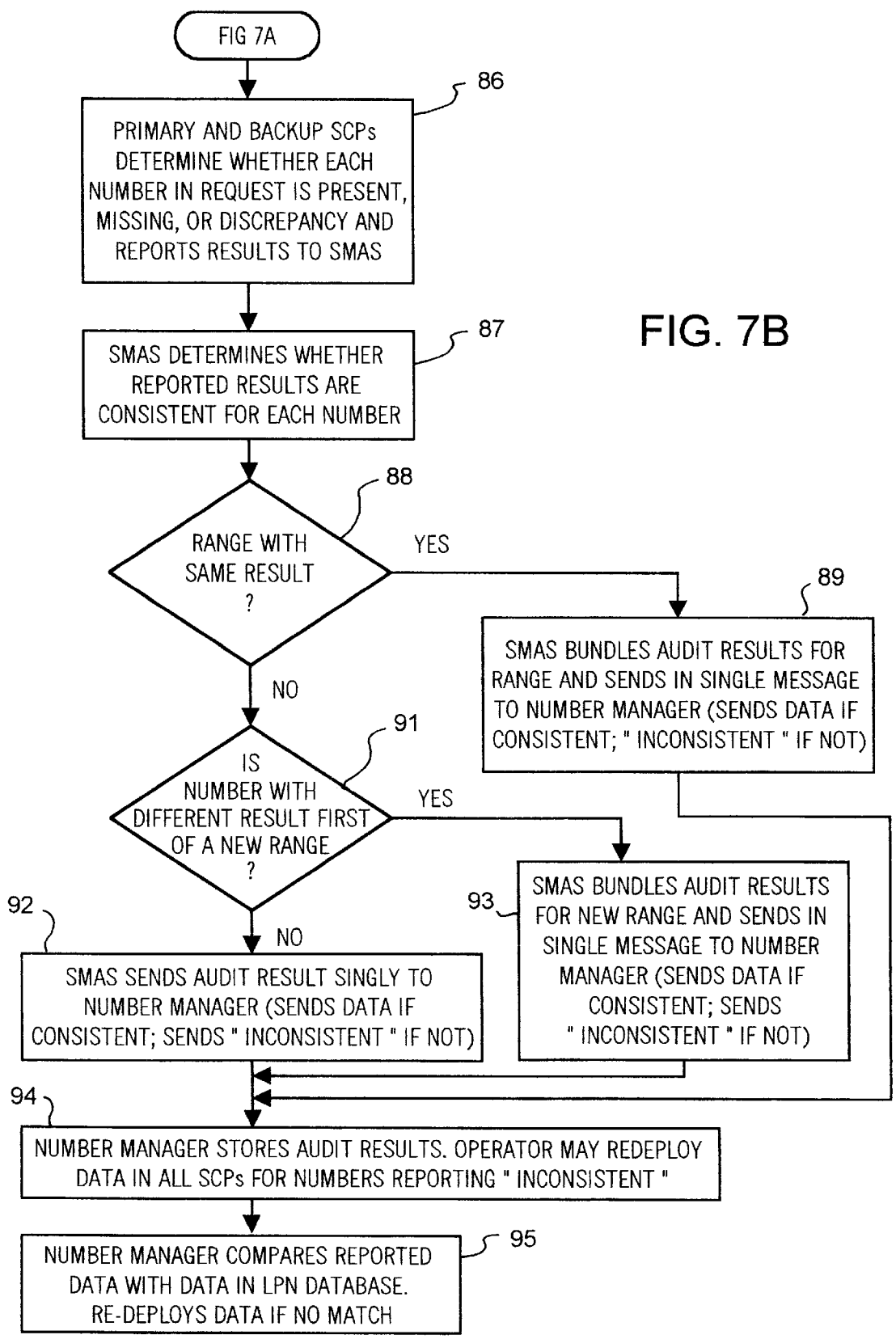

FIGS. 7A and 7B are a flow chart of the steps of the method of the present invention when the LSMS 32 performs an audit of ported LNP number data in the LNP network elements. The method begins at FIG. 7A, step 76 where the Number Manager 34 in the LSMS initiates the audit request. At 77, the Number Manager determines whether or not there are sequential numbers in the audit request. If yes, the method moves to step 78 where the number bundler 36 bundles the ranges of sequential numbers and sends ranges of numbers to the SMAS 38 for auditing. If a non-sequential number is to be audited, the method moves to step 79 where the Number Manager 34 sends the number as a single number to the SMAS.

The SMAS receives the numbers at step 81 and stores them in the request queue 45. Each bundled range of numbers falls within a single NPA-NXX designation, but the bundled range may span several LNP network elements. The bundled range of numbers may fall within the range of numbers stored within a single LNP network element, or may span several LNP network elements. Therefore, at step 82, the SMAS determines which portion of the bundled range is assigned to each LNP network element, routes the range of numbers appropriately to the assigned LNP network element(s), and queries the LNP network element(s) to report the associated LNP data for each number in the range. Non-sequential numbers are routed to their assigned LNP network element singly. At step 83, the SMAS routes all numbers received in the audit request to the backup LNP network element(s) and queries the backup LNP network element to report the associated LNP data for each number. The method then moves to FIG. 7B.

At step 86, each LNP network element which receives an audit request determines whether each number in its request is present, missing, or a discrepancy (i.e., different LNP data is stored) and reports the results to the SMAS. At 87, the SMAS determines whether the reported data for each number is consistent between the assigned LNP network element and the backup LNP network element for each number in the audit request. At step 88, the SMAS determines whether or not there is a range of sequential numbers for which the audit results are the same. For example, there may be a range of numbers for which the audited data is consistent, or a range of numbers for which the audited data is inconsistent. If there is a range of numbers for which the audit results are the same, the method moves to step 89 where the SMAS bundles the sequential numbers in the range and sends the audit result for the bundled range in a single message to the Number Manager 34. If the reported results are consistent for each number in the range, the SMAS sends the reported data to the Number Manager. If the results for the entire range are inconsistent, the SMAS does not know which data are correct, and therefore sends an "inconsistent" indication to the Number Manager.

If there is a break in the range of numbers for which the audit results are the same (i.e., one or more numbers for which the audit results are different from the previous number), the method moves to step 91. At step 91, the SMAS determines whether the first number with a different result is a single number with that result or is the first number in a new range with that result. If the first number with a different result is a single number with that result, the method moves to step 92 where the number is sent singly to the Number Manager. If the first number with a different result is the first number in a new range with that result, the method moves to step 93 where the SMAS bundles the sequential numbers in the range and sends the audit result for the bundled range in a single message to the Number Manager 34. If the reported results are consistent for each number in the range, the SMAS sends the reported data to the Number Manager. If the results for the entire range are inconsistent, the SMAS does not know which data are correct, and therefore sends an "inconsistent" indication to the Number Manager.

After the SMAS sends either data or "inconsistent" indications to the Number Manager at steps 89, 92, or 93, the method moves to step 94 where the Number Manager stores the results of the audit. An operator may then re-deploy the LNP data for the numbers which were reported as inconsistent. The LNP data may be re-deployed in all of the network elements in which the inconsistent numbers were deployed (for example, the primary and the backup LNP network elements). For those numbers which were consistent, and data was reported to the Number Manager, the Number Manager compares the reported data to the data in the LNP database 35 at step 95. If the reported data does not match the data in the LNP database, the LNP data may be re-deployed in all of the appropriate network elements. If the reported data matches the data in the LNP database, the audit for those numbers is complete, and no further action is taken.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of auditing Local Number Portability (LNP) data including ported telephone numbers deployed from a Local Service Management System (LSMS) to a primary LNP network element and a backup LNP network element in a telecommunications network, said LSMS including a Number Manager with a LNP database and a Service Management Application System (SMAS), said method comprising the steps of:

sending an audit request from the Number Manager to the SMAS, the audit request including telephone numbers to be audited in the LNP primary network element and the backup LNP network element;

transmitting a first retrieval message from the SMAS to the primary LNP network element, said first retrieval message including a range of sequential telephone numbers in a single message, and requesting the primary LNP network element to retrieve and report the LNP data associated with each telephone number in the range;

transmitting a second retrieval message from the SMAS to the backup LNP network element, said second retrieval message including the range of sequential telephone numbers in a single message, and requesting the backup LNP network element to retrieve and report the LNP data associated with each telephone number in the range;

reporting from the primary LNP network element and the backup LNP network element to the SMAS, the LNP data associated with each telephone number in the range;

determining in the SMAS whether the LNP data reported by the primary LNP network element is consistent with the LNP data reported by the backup LNP network element; and reporting an inconsistency to a network operator, upon determining that the LNP data reported by the primary LNP network element and the backup LNP network element are inconsistent.

2. A method of deploying Local Number Portability (LNP) data for a telecommunications network from a Local Service Management System (LSMS) having a Service Management Application System (SMAS) to a plurality of LNP network elements said method comprising the steps of:

deploying a plurality of primary LNP network elements;

backing up the plurality of primary network elements with a single backup LNP network element;

routing a first range of sequential telephone numbers from the SMAS to a first one of the primary LNP network elements in a first single message, the first range of sequential telephone numbers being a first subset of the total LNP data for the network;

routing the first range of sequential telephone numbers from the SMAS to the backup LNP network element in a second single message;

routing a second range of sequential telephone numbers from the SMAS to a second one of the primary LNP network elements in a third single message, the second range of sequential telephone numbers being a second subset of the total LNP data for the network; and routing the second range of sequential telephone numbers from the SMAS to the backup LNP network element in a fourth single message.

* * * * *